United States Patent [19]

Dumas

[11] Patent Number: 4,656,654
[45] Date of Patent: Apr. 7, 1987

[54] COMPUTER ASSISTED GRAPHIC TELECONFERENCING METHOD AND APPARATUS

[75] Inventor: Neil S. Dumas, Mclean, Va.

[73] Assignee: The United States of America as represented by the Secretary of the Army, Washington, D.C.

[21] Appl. No.: 849,314

[22] Filed: Apr. 8, 1986

Related U.S. Application Data

[63] Continuation of Ser. No. 598,751, Apr. 11, 1984, abandoned.

[51] Int. Cl.$^4$ ............................................ H04M 11/00
[52] U.S. Cl. ........................................ 379/96; 379/97
[58] Field of Search .............. 179/2 DP, 2 TV, 2 TS, 179/18 BC; 358/85; 370/62

[56] References Cited

U.S. PATENT DOCUMENTS

| 4,258,387 | 3/1981 | Lemelson et al. | 358/85 |
| 4,291,198 | 9/1981 | Anderson et al. | 179/2 DP |
| 4,317,961 | 3/1982 | Johnson | 179/18 BC |
| 4,414,621 | 11/1983 | Bown et al. | 179/2 DP X |
| 4,524,244 | 6/1985 | Faggin et al. | 179/2 DP |

OTHER PUBLICATIONS

Cutler, "Displayphone: An Interactive Graphic Communication Experiment", Conference: Electronic Text Communication, Munich Germany, Jun. 12-15 1978, pp. 323-329.
Ninke et al., "An Experimental Display Terminal", Conference: 1976 International Conference on Digital Communications, Zurich, Switz., Mar. 9-11 1976, pp. B6.1-B6.6.
Higginbotham et al., "Teleconferencing Systems", *IBM Technical Disclosure Bulletin*, vol. 22, No. 9, Feb. 1980, pp. 3923-3925.
Stockbridge, "The Evolution of a Multimode Multilocation Audioconferencing System", 8079 Electro Conf. Record, vol. 4, Apr. 7, 1979, pp. 1-11.

*Primary Examiner*—Keith E. George
*Attorney, Agent, or Firm*—Sheldon Kanars; Jeremiah G. Murray; John T. Rehberg

[57] ABSTRACT

An audiographic telephone conferencing system between a plurality of parties or users either directly connected or through a piece of apparatus known as a "meet me bridge" over voice grade telephone lines. Each user has a programmed personal computer which controls a programmable or "smart" modem, cassette recorder/player, and speakerphone. A protocol is implemented by the software, i.e. the computer program, in each of the computers which puts its respective modem in a listening mode to monitor the phone line at all times. The computer is further programmed and includes a memory for storing and transmitting graphics presently on hand to other user(s) via the modem during a teleconference or alternatively receive graphics from another user, or it can switch to an external graphics program to make new or modify existing graphic images. However, one is unable to speak on the telephone line while a graphic is being transmitted during a teleconference due to the fact that voice alternates with graphic transmissions.

7 Claims, 17 Drawing Figures

Microfiche Appendix Included
(1 Microfiche, 21 Pages)

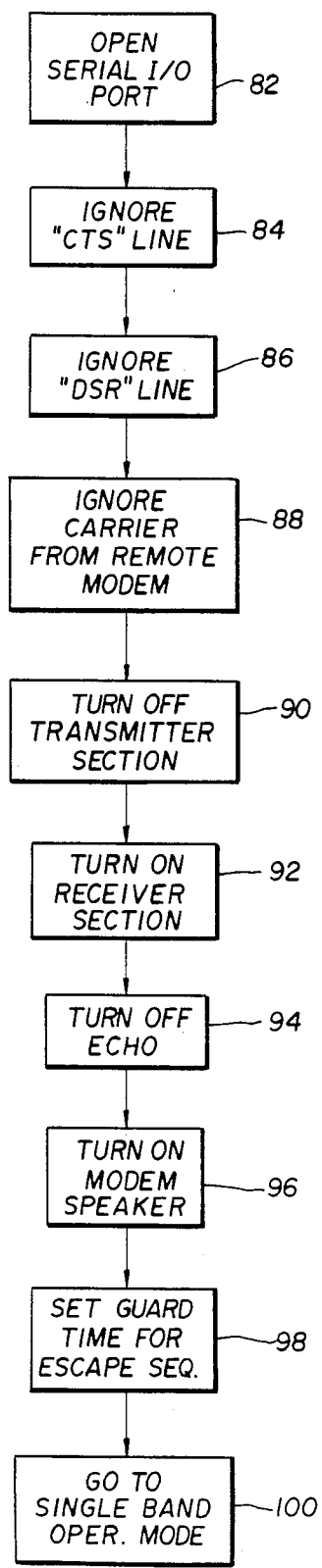
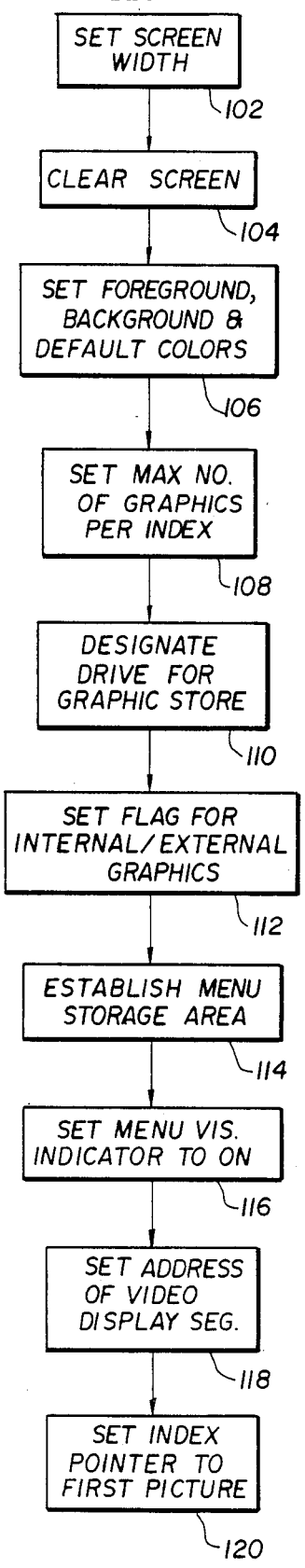
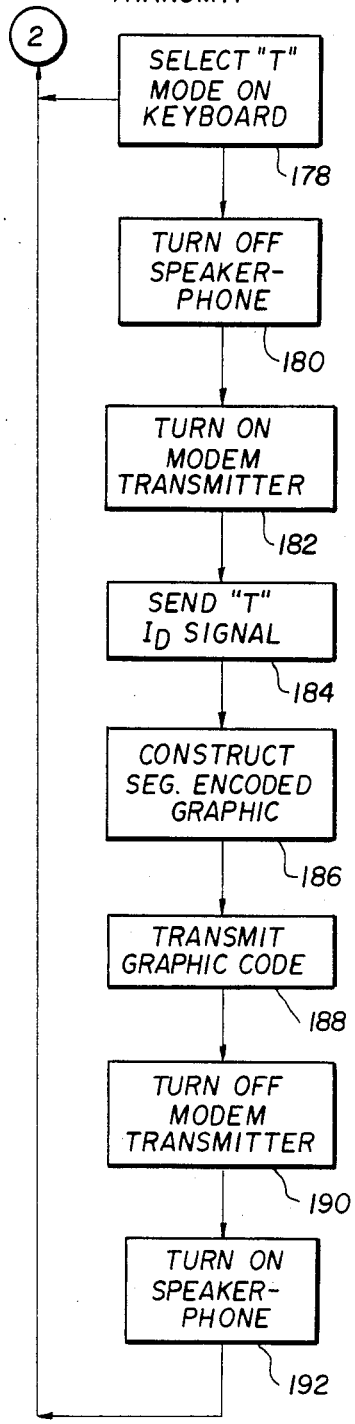

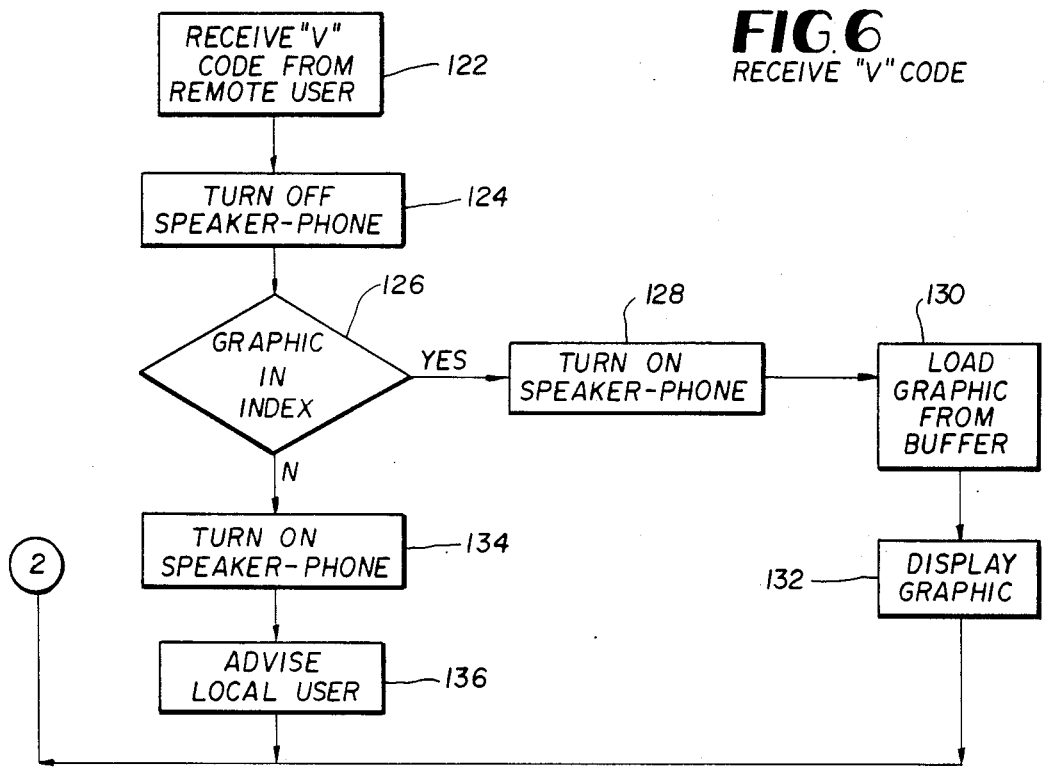
FIG.6 RECEIVE "V" CODE
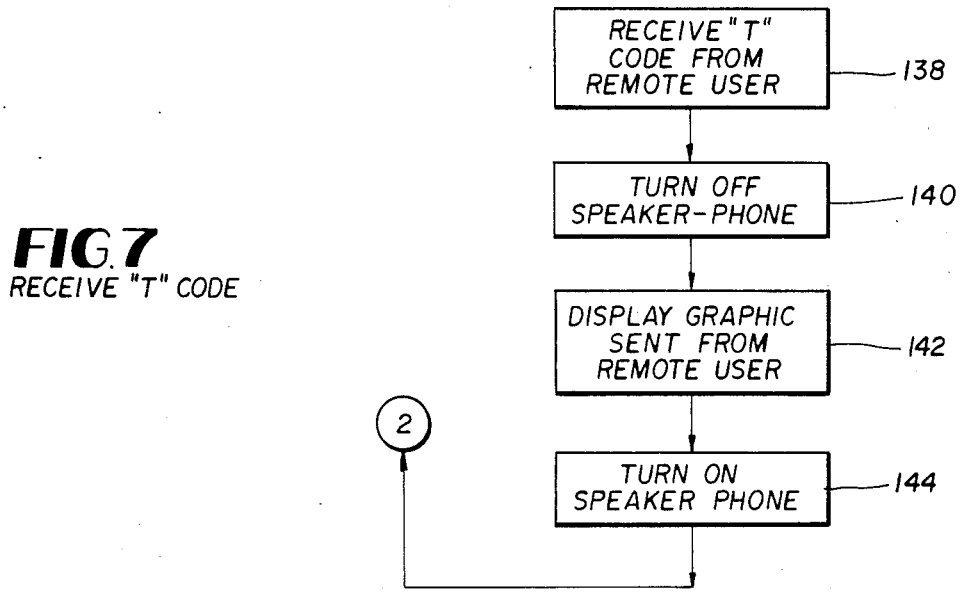
FIG.7 RECEIVE "T" CODE

USE

SAVE

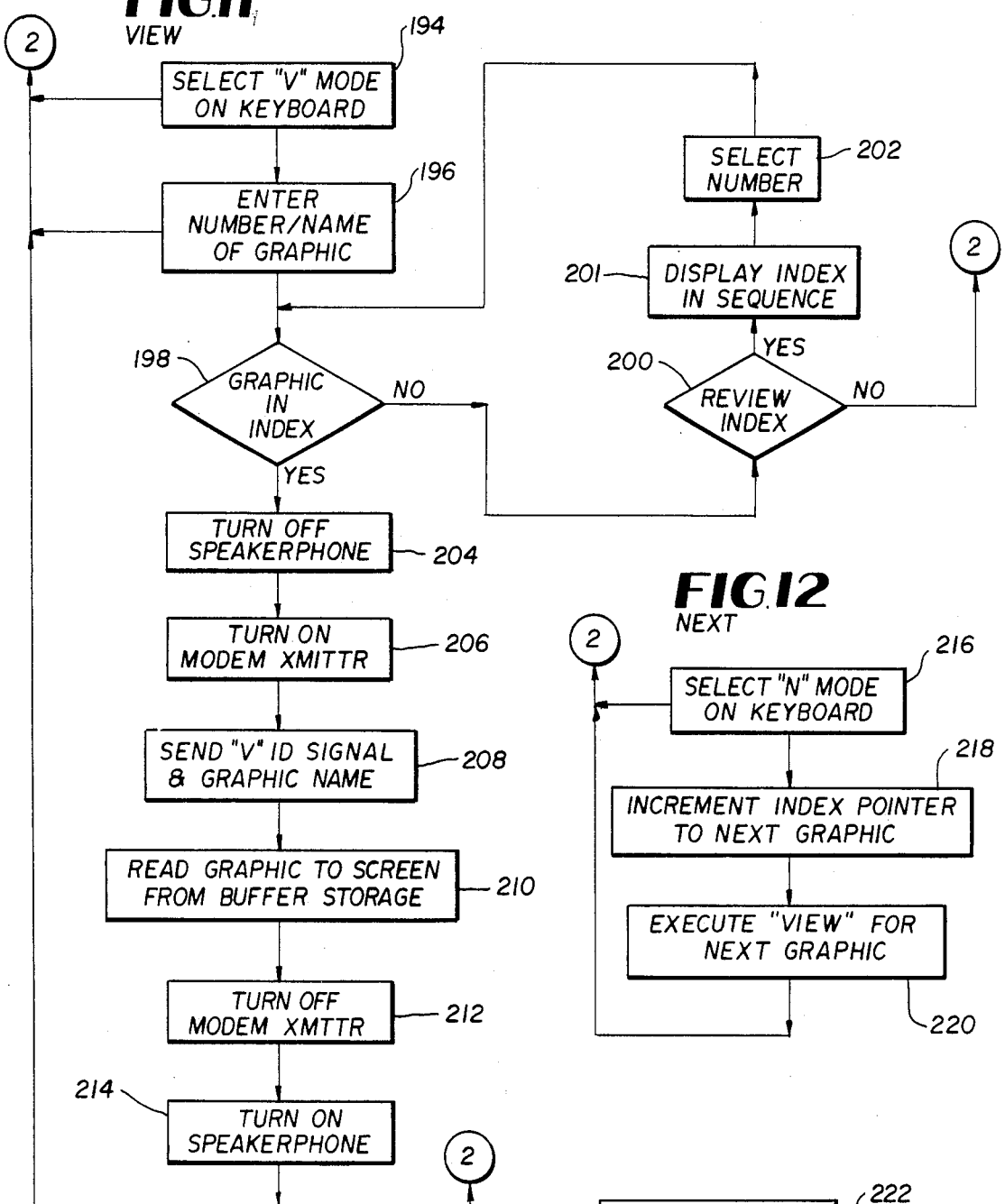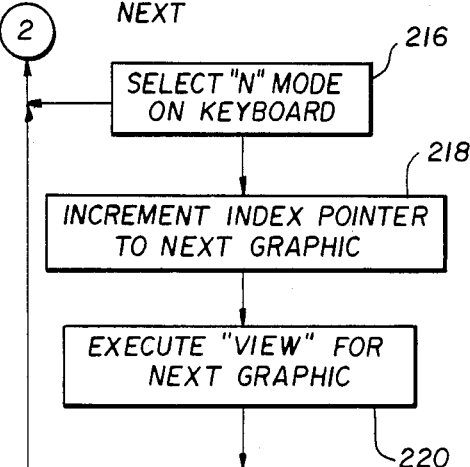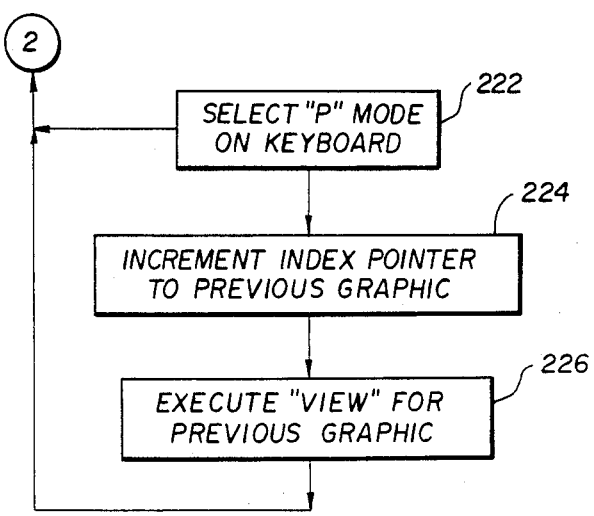

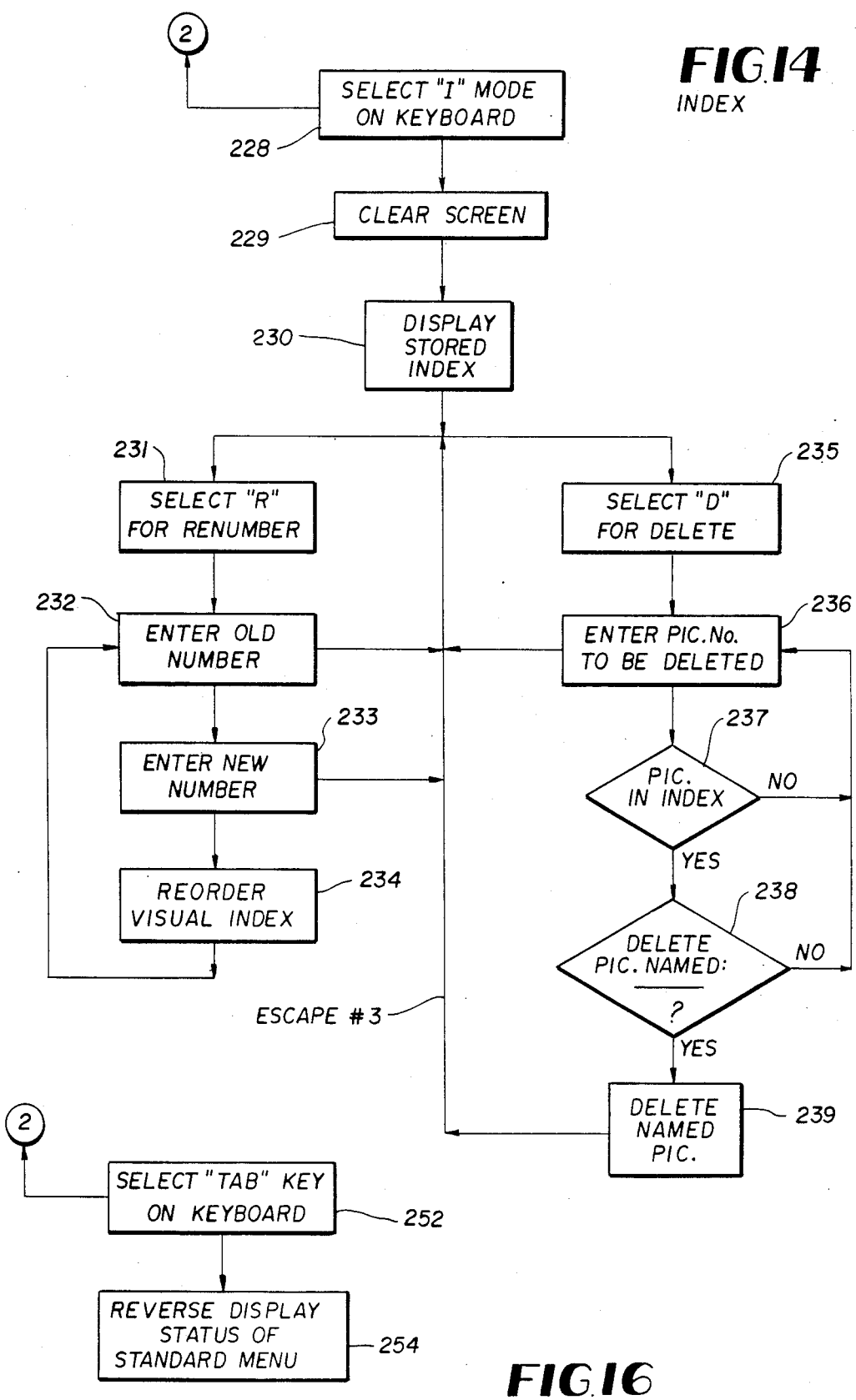

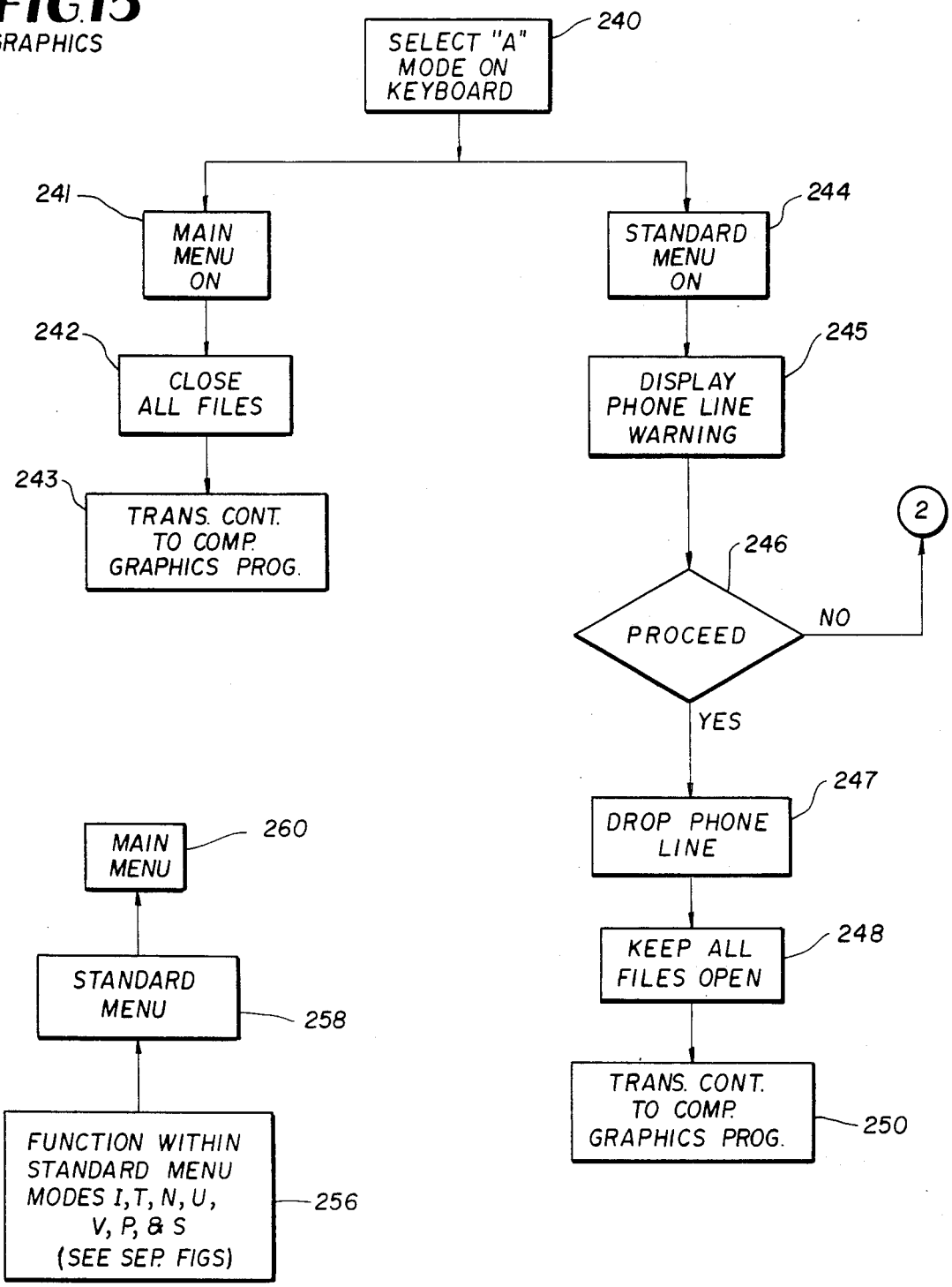

COMPUTER ASSISTED GRAPHIC TELECONFERENCING METHOD AND APPARATUS

The invention described herein may be manufactured, used and licensed by or for the Government for governmental purposes without the payment to me of any royalties thereon or therefor.

This application is a continuation of application Ser. No. 598,751, filed Apr. 11, 1984, now abandoned.

REFERENCED MATERIAL

Reference is made to the microfiche Appendix which sets forth a computer program listing including that which is applicable to the present invention. Included is 1 microfiche containing a total of 21 frames.

FIELD OF THE INVENTION

This invention relates generally to telephone communications systems and more particularly to computer enhanced telephone conferencing systems permitting the sending or receiving of graphics to the connected parties prior to or during a particular telephone conference.

BACKGROUND OF THE INVENTION

In multiperson conferences, most people's first choice for a conference would be a face-to-face meeting with all of the participants or parties. All conversations are then in real time but at a great deal of expense, particularly where participant travel is involved. One alternative to face-to-face meetings is a TV conference wherein participants go to local TV studios for an electronic "face-to-face" meeting. TV meetings tend to lessen cost by reducing travel but studios equipped for TV conferencing are limited and facility rental might occasionally even exceed actual face-to-face meeting costs. Still another alternative would be a specially equipped conference room, e.g., with an electronic blackboard, that might be more readily available and at a lower cost than TV conferencing. While this eliminates face-to-face contact, two telephone lines, one of which must be a dedicated high speed data circuit, are usually required for a link-up at each site. Then there is the well known telephone conference call which comprises a widely used relatively inexpensive way of conducting a conference. However, telephone conferencing provides a voice only system even though it is economical enough to permit each individual to have a regular telephone unit.

Computer conferencing, although known, is usually limited to terminal produced text communications with other participants via a central or host computer. A relatively permanent transcript of the text is produced as a by-product of using a host computer, thus allowing participants to enter or leave the "meeting" at uncoordinated times. A returning conferee need only read the proceedings actually missed. Messages may be left for non-attendees. Computer conferencing offers but has not yet realized the potential of using the computer itself as an interactive participant, such as fetching data not previously retrieved and/or conducting real time analyses during the conference. While all of the above prior art systems are useful for the task intended, they lack one or more certain desirable but heretofore unavailable features.

Accordingly, it is an object of the present invention to provide an improved method and apparatus for implementing a conference via a telephone.

Another object of the invention is to provide facilities for recording conferences, sending or receiving messages so that all parties need not be simultaneously present.

Still another object of the invention is to provide an improved method and apparatus for integrating graphics into a telephone conference.

A further object of the invention is to provide a method and apparatus for implementing audio-visual teleconferencing on a real time or delayed basis.

Still another object of the invention is to provide a method and means whereby computerized control of a telephone conferencing system permits the transmission and reception of graphics between the parties prior to or during a telephone conference.

SUMMARY OF THE INVENTION

Briefly, the subject invention comprises a computer enhanced telephone conferencing system providing dial-up audiographic communications between a plurality of participants or users, each having a personal computer specifically programmed to control a programmable modem and telephone apparatus such as a speakerphone, and with the parties being connected by voice grade telephone lines via direct connection, an operator connection, a meet-me-bridge or other appropriate apparatus. The computer software is operable to control the speakerphone, turning it on and off at appropriate times to eliminate room noise during the transmission or reception of color graphics during a telephone conversation. Each modem is furthermore controlled by the computer to be "live", that is on-line in a silent receive mode status unless transmitting and thus operates to monitor the phone line at all times. The computer is furthermore programmed to ignore all signals on the phone line except when proceeded by one of a predetermined set of identification codes, indicating that a graphics related signal is being transmitted to another conference participant. The computer, moreover, is operable to control the reception of incoming signals from remote users and either display a graphic transmitted therefrom, retrieve and display a graphic presently contained in a local storage, maintain the display unchanged, dial up a remote user, transmit a graphic thereto or request a graphic on hand in his local buffer storage to be displayed. Also when desirable one can switch to a companion graphics program to create new and/or modify existing graphics.

All users connected on the telephone line are in a parallel hook-up, i.e., all receive a transmitted graphic(s) simultaneously or alternatively, all hear voice communications simultaneously. All graphic images and associated data, such as title and text description for each graphic image, moreover, can be bulk transmitted in an unattended mode, i.e., forwarded to and stored at a remote location. In this event, programmed procedures are provided for setting the order of presentation, transmitting only picture titles and causing simultaneous retrieval at all conferencing, i.e., user locations.

In addition to live, interactive conferencing, the system provides for delayed conferences wherein users are not all simultaneously present and leave voice-graphic messages for each other on computer controlled cassette recording apparatus, also included in the system. Further, the recording apparatus provides a record of the entire voice-graphics conference on a recording medium.

BRIEF DESCRIPTION OF THE DRAWINGS

The foregoing as well as other objects and advantages of the invention will be more readily understood when considered in light of the detailed description to follow taken in connection with the accompanying drawing in which:

FIG. 4 is a software flow diagram illustrative of the steps for initializing each modem shown in FIGS. 1 and 2;

FIG. 5 is a software flow diagram for initializing the program variables in each computer shown in FIGS. 1 and 2;

FIG. 6 is a flow diagram illustrative of the operational mode of one user's computer wherein a code for viewing a locally stored graphic is received from another user;

FIG. 7 is a flow diagram illustrative of the operational mode of one user's computer wherein a code is received for receiving and displaying a picture or graphic sent from another user; and FIGS. 8 through 17 comprise a set of flow diagrams illustrative of ten computer controlled operational sequences selectable by way of the keyboard at each computer.

DETAILED DESCRIPTION OF THE INVENTION

Figure 1:
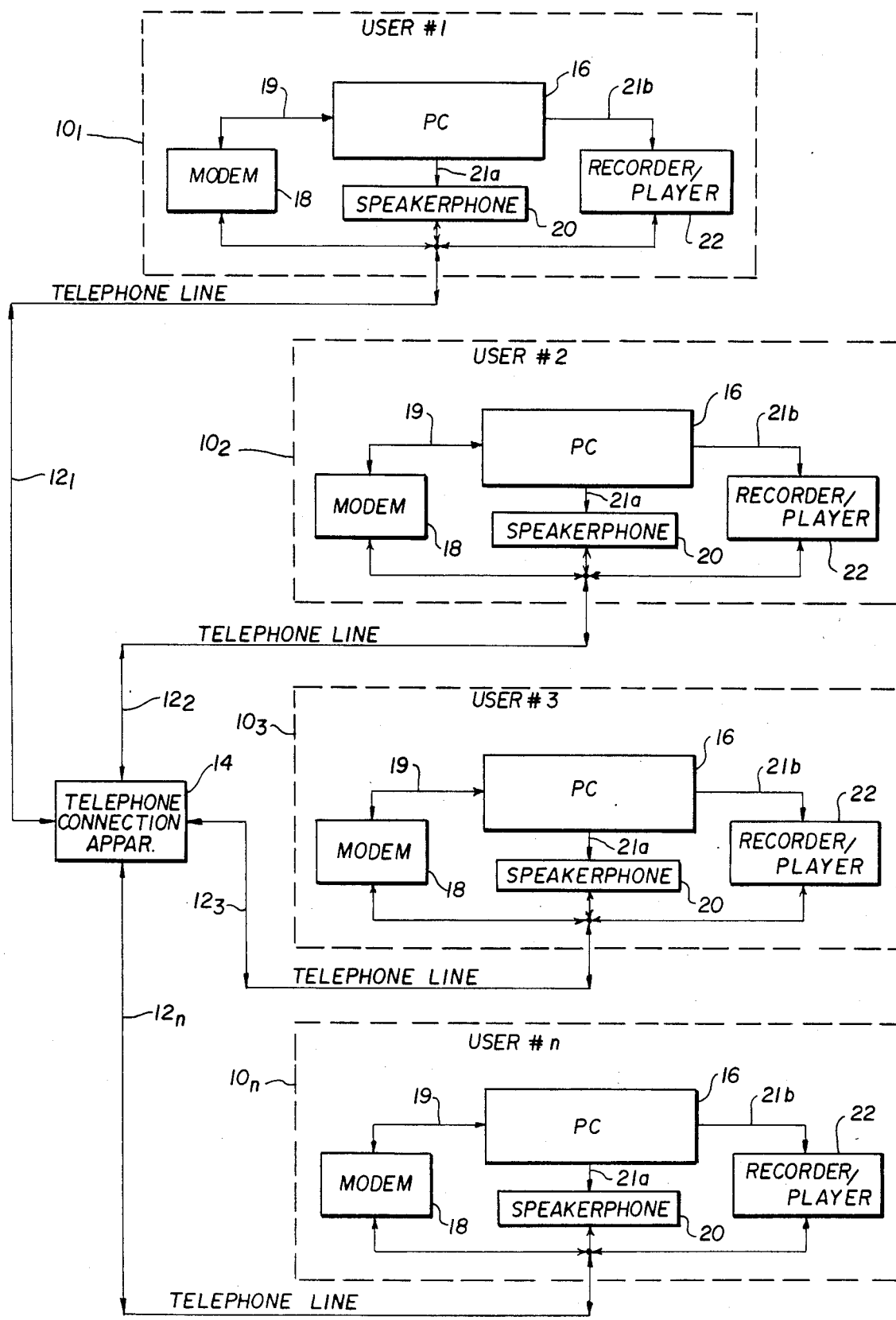
FIG. 1 is a block diagram broadly illustrative of an audiographic telephone conference system in accordance with the subject invention.

Referring now to the drawings and more particularly to FIG. 1, the subject invention is directed to an audiographic teleconferencing system and its method of operation whereupon a plurality of user apparatus $10_1$, $10_2$, $10_3$ ... $10_n$ of n participants or users are interconnected over standard voice grade telephone lines $12_1$, $12_2$, $12_3$ ... $12_n$ by way of telephone connection apparatus 14 comprising either means for a direct connection, an operator connection or conference call connection means such as a "meet-me-bridge". A meet-me-bridge is a well known piece of telephone apparatus employing amplifying circuitry and which operates to eliminate line drop in a telephone conferencing system connection between parties.

Each user apparatus $10_1$ ... $10_n$ of the system shown in FIG. 1 further comprises a computer 16 such as an IBM Personal Computer which is programmed to operate in accordance with self contained software, to be explained in detail subsequently. Each personal computer (PC) 16 is bidirectionally coupled to and controls the operation of a programmable modem 18, such as a Hayes Smartmodem 1200, via a signal path 19 including an input/output port, now shown. The PC also controls turn on and turn off of speakerphone type of telephone apparatus 20 and an audio cassette recorder/player 22 by means of power leads 21a and 21b. The recorder/player 22 is adapted to provide a record of a particular telephone conference at the time it is in progress or record audiographic messages in an unattended mode.

Before considering the invention in any further detail, however, it should be pointed out that the system of the present invention operates with a computer protocol where no "handshaking" is required for interaction between the n participants hereinafter referred to simply as users, due to the fact that when the system is in operation, all of the computer controlled modems 18 are silent, i.e. in a receive mode unless the respective personal computer 16 orders it to transmit graphic information to one or more other users. Accordingly, any number of the computers 16 in the network of FIG. 1 can receive the same digital information from another user computer simultaneously via their modems 18, the only constraint being that the user(s) are unable to hear each other speak during the transmission of a picture, hereinafter referred to as a graphic, in the event that visual information is to be transferred between users during a telephone conference. In some instances, the visual information is transmitted to one or more other users or parties prior to a telephone conference. In such instances, it is entered into the user's recorder/player 22 and thereafter retrieved and displayed during the conference.

Figure 2:
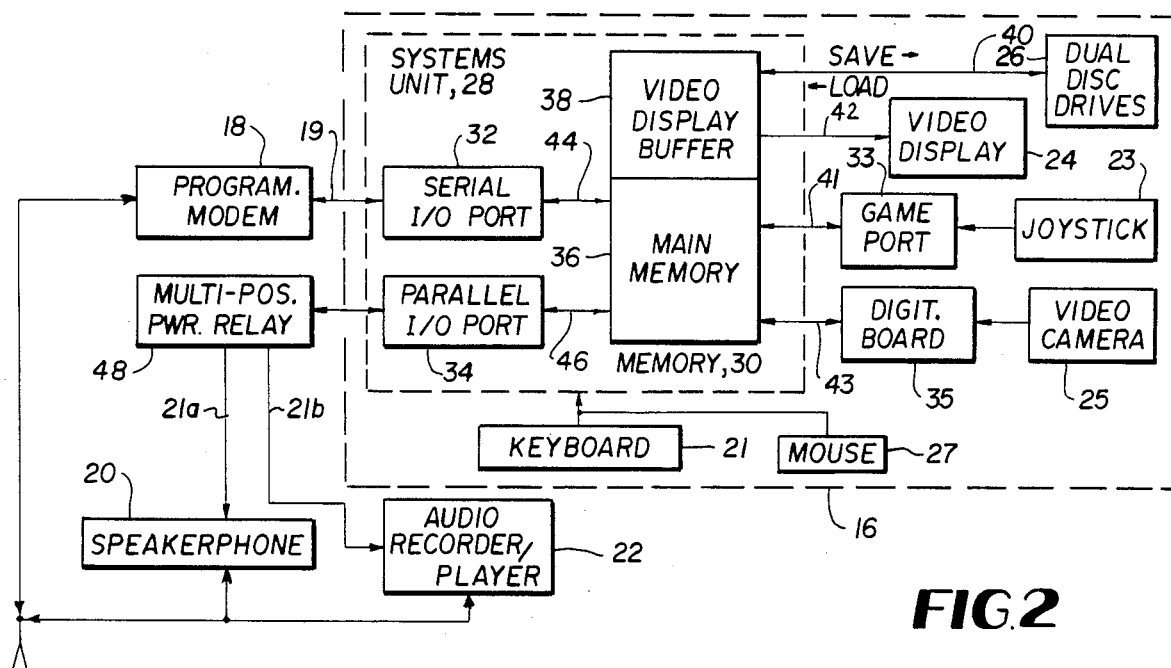
FIG. 2 is a block diagram illustrative of the apparatus required by each user in the system shown in FIG. 1.

This now leads to a consideration of FIG. 2 which is intended to further disclose the details of one of a plurality of identical user apparatus $10_1$ ... $10_n$. As shown in FIG. 2, each personal computer 16 is comprised of a keyboard 21, joystick 23, and videocamera device 25, a visual display unit 24 including a cathode ray tube (CRT) and two disk drive units 26, comprising a floppy or hard disk drive unit containing a disk, not shown, all of which couple to a system's unit 28 which in an IBM PC includes a digital memory 30 and at least one serial input-output (I/O) port 32, a game port 33, one parallel I/O port 34 and a digitizing board 35. When desirable, other input devices such as "mouse" and light pen can be utilized. For example, a mouse shown by reference numeral 27 can be connected to the system unit 28 via the same input port, now shown, as the keyboard 21. A light pen would be coupled in parallel with the joystick to the same port 41. The memory 30 includes a main memory section 36 which, among other things, stores a computer program comprising a sequence of instructions in the form of an operational code which is further set forth in referenced Appendix and is outlined in the flow charts depicted in FIGS. 3 through 17. The memory 30 also includes a video display buffer section 38 which is bi-directionally coupled to the dual disk drive unit 26 via a data bus 40 and to the video display unit 24 by means of the digital data bus 42. The game port 33 is shown coupled to the main memory section 36 via the data bus 41 while the digitizing board is coupled thereto by means of data bus 43. The serial I/O port 32 is coupled to the main memory section 36 by bus 44 and operates to couple the main memory section to the programmable modem 18. The parallel I/O port 34 couples to the main memory by bus 46 for controlling the operation of a multiposition power relay 48 which activates or deactivates speakerphone 20 and/or cassette recorder 22 at appropriate times.

In operation, each personal computer 16 is programmed to initialize its respective programmable modem 18 into a listening mode which will then operate to monitor the phone line 12 at all times. The computer 16 is further programmed to monitor all signals and execute authorized commands proceeded by an identification code which, for example, indicates that the following signal is a graphic image signal, whereupon the computer 16 turns off the speakerphone 20 and graphic image information will either be transmitted to or received from another computer 16 or responds to a command to display graphic images currently in storage and thereafter displayed on the video display unit 24. The computer operation of the associated modem 18, moreover, requires only half of the available bandwidth to transmit or receive graphics via the respective modems 18 over a voice grade telephone line 12. This provides for possible use of twin transmitters or receivers, not shown, to double transmission rates and thus reduce transmission time by one half.

In order to fully understand system operation, however, one must consider the software, i.e., the computer program, contained in each of the personal computers 16 in order to make the system operate as intended. Pursuant to this, the following flow charts as disclosed in FIGS. 3 through 17 will be considered with reference to one of the participants being considered a local user (LU) with the other participants being considered remote users (RU).

Figure 3:
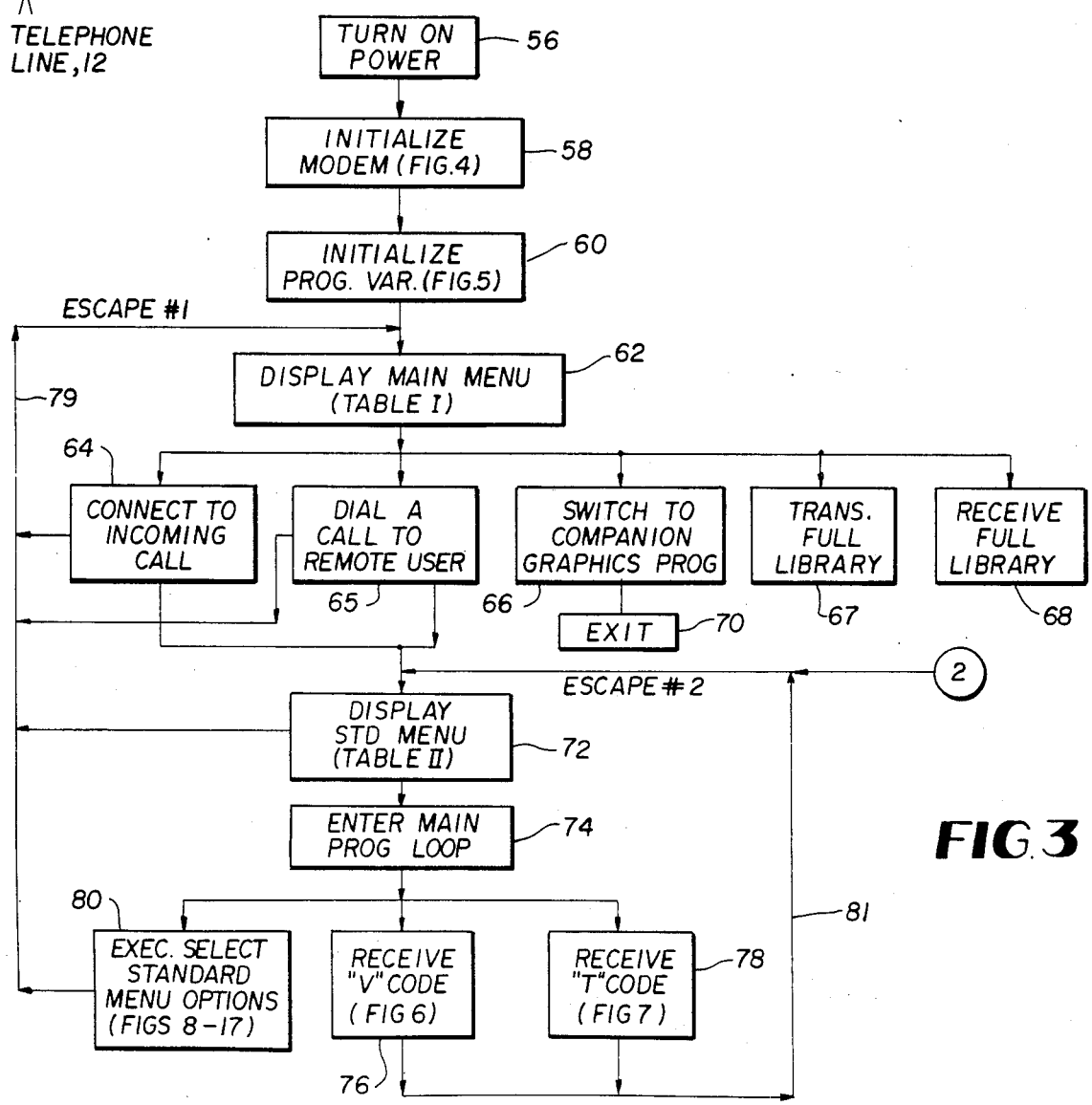
FIG. 3 is a flow diagram providing an overview of the operational software included in each personal computer of the system shown in FIG. 1.

Accordingly, and now referring first to FIG. 3, disclosed thereat is an overview of the operation of each user equipment. When a local user (LU) wants to use the system, he must first turn on his computer 16 as indicated by reference numeral 56. Thereafter the computer initializes or "boots up" the program which comprises a set of initialization statements that prepare the program for execution. The computer controlled steps include initializing the modem 18, the steps of which are shown in FIG. 4 by reference numeral 58, initializing the program variables 60, the steps of which are shown in FIG. 5, and a display of an initial or "Main Menu" as indicated by step 62. The Main Menu consists of five user options which are set forth in the following Table I and which are selectable from the user's keyboard 21 (FIG. 2).

TABLE I

Main Menu

1. Connect to an Incoming Call From Remote User(s)
2. Dial a Call To Remote User(s)
3. Switch to Companion Graphics (Army Graphics)
4. Transmit a full library and index of graphics To Remote User(s)
5. Receive a full library and index of graphics From Remote User(s)

By selecting option No. 1, the local user connects to an incoming call from a remote user as indicated by step 64. By option No. 2 the local user automatically dials a remote user telephone either directly or through the bridge 14 per reference numeral 65 while option No. 3 transfers to a Companion Graphics program stored along with the subject program in his personal computer 16 and which is shown by reference numeral 66.

Option No. 4 permits a user to transmit an entire collection or library of graphic images one after another without pause as shown in step 67. Finally, option No. 5 permits a user to automatically receive and save a complete library of graphics including the index information, i.e., graphic name and description as shown in step 68.

Further as indicated in FIG. 3, the two option steps 64 and 65 of connecting to an incoming call or dialing a remote user telephone permits an "escape" from either operational sequence through the keyboard 21 whereupon depressing of a designated "Escape" key causes the program to revert back to the display of the Main Menu as evidenced by step 62. In the event that a "Switch To Companion Graphics" is selected from the keyboard 21, the program immediately exits to this graphics program and terminates there as evidenced by the step 70.

In the event that preparation for a formal presentation is desired, a facility is further provided whereby the presenter can have his personal computer 16 automatically call all other participants, i.e. remote users, and transmit an entire library of graphics in advance of actual usage as shown in step 67. Similarly, if this full library transmission mode is to be employed, all remote user recipients are required to leave their unattended personal computers in a storage mode which is initiated via the fifth Main Menu option "Receive" (step 68). This mode comprises putting the remote user's personal computer 16 into an auto-answer mode to accept and store a complete library of graphics including index information without human attention.

Assuming that either option No. 1 or No. 2 of connecting to an incoming call or dialing a remote user telephone is selected, a subroutine whereby the display of a "Standard Menu", as shown by reference numeral 72, occurs. The Standard Menu consists of ten options selectable from the keyboard 21 as set forth in the following Table II.

TABLE II

Standard Menu

1. USE—Retrieve Graphic From Storage To Screen—(FIG. 8)
2. SAVE—Store New Graphic (Screen to Disk)—(FIG. 9)
3. TRANSMIT—Transmit Graphic On Screen To Remote User—(FIG. 10)
4. VIEW—Request Remote User To Retrieve Graphic From His Storage To His Screen—(FIG. 11)
5. NEXT PICTURE—View Command For Next Appropriate Graphic as arranged in the Index—(FIG. 12)
6. PREVIOUS PICTURE—View Command For Previous Appropriate Graphic as arranged in the Index—(FIG. 13).
7. INDEX—Display title and description of All Stored Graphics—(FIG. 14)
8. GRAPHICS—Selects "External Graphics" Program—(FIG. 15)
9. TAB—Display Or Suppress Display Of Standard Menu—(FIG. 16)
10. ESCAPE—Abort And Return to Main Menu—FIG. 17)

Along with the display of the Standard Menu, a main program loop is entered, as shown by reference numeral 74, which operates to continuously check the modem 18 or the keyboard 21 for a command which involves either receiving a view "V" code or a transmit "T" code from a remote useras evidenced by steps 76 and 78 or executes per step 80, one of the ten selectable Standard Menu options from the keyboard 21. In order of preference the main program looks first to the keyboard 22 and then to the modem 18. The receive "V" code and "T" code operation is further disclosed in the flow charts of FIGS. 6 and 7, respectively, while the operation of the Standard Menu options is set forth in the flow charts shown in FIGS. 8 through 17.

It is to be noted that the two operations of receiving the "V" and "T" codes permit a return, i.e. an "escape" route 81 back to the Standard Menu and the main program loop steps 72 and 74 as referenced by ESCAPE #2 shown in FIG. 3. This escape is provided by depressing a designated "Escape" key on the keyboard 21. However, while the Standard Menu is displayed and prior to or during the display of the Standard Menu (step 72), an escape route 79 back to the display of the Main Menu (step 62) is provided by depressing the "Escape" key, in which case ESCAPE #1 is provided back to the Main Menu display shown in Table I.

Considering now the operational software in further detail, reference is now made back to the first sequence of instructions following the turn on of power (step 56) which involves the initialization of the modem 18. This is shown in FIG. 4. The first thing that is done is to open a communications port, namely the serial I/O port 32 (FIG. 2) which connects the modem 18 to the Main Memory section 36 of the computer 16. This is shown in FIG. 4 by step 82. The port 32 is initialized with data to be transmitted using eight bits of data with no parity bits and two stop bits. Further the port 32 is set up so that two control lines, now shown, will be ignored, namely, the "clear to send" (CTS) line and the "data set ready" (DSR) line. This is indicated in FIG. 4 by reference numerals 84 and 86. Once port 32 is initialized, a command is sent to the programmable modem 18 to set several parameters, the first of which is to ignore the carrier from a remote user modem 18 as indicated by step 88. This means that no matter whether the local user modem 18 hears the remote carrier or not, it is to stay "on line", i.e. connected to the telephone line 12. The second parameter is to turn off the transmitter section of the modem, which includes both a transmitter section and a receiver section, not shown, as well as an input data buffer, and turn on the receiver section as indicated by reference numerals 90 and 92. It should be pointed out that once the receiver section is turned on, it is never turned off but remains "alive" as long as the system is active and the computer 16 is turned on. Next a command is issued which turns off modem echo as evidenced by reference numeral 94. This suppresses result codes from local user's modem 18 so that the modem will not echo back characters that are transmitted to it from a remote user modem 18 when it is on line. Additionally, it suppresses internal result codes from being transmitted from the local user modem 18, that is, ordinarily when a command is sent to the modem it will echo back to the remote user modem a result of the code indicating what happened with the command it has received. Next a parameter is set (step 96) which turns on the modem speaker, also not shown, integral with the modem 18, so that it will be on until it is commanded otherwise, such as when the local user is connected to a remote user. Following this, a parameter sets the guard time for an "escape" sequence sent to the modem. This is shown by reference numeral 98. The escape sequence is required to switch the local user modem 18 from being on line with a remote user computer 16 to being in the command state when commands may be sent to change its condition. The guard time is the amount of pause that must surround a particular escape sequence.

Finally the local user modem 18 is placed in a mode in which it will transmit and receive on the same frequency as shown by step 100. This is important to this invention in that it has the effect of restricting modem operation to one half the total bandwidth available and thus permits the computer 16 to operate pairs of transmitters or receivers to send or receive pictures or graphics transmitted over the voice grade telephone line 12. When only one modem (single transmitter and receiver pair) is used, only half the bandwidth is actually used. The lower frequency half is selected because this part of the bandwidth provides somewhat more reliable communications than the high frequency part.

After the modem 18 of the local user is initiated, a series of statements are next executed which sets certain program variables to be used in the respective program of the local user's personal computer 16. This is disclosed in FIG. 5 and which is entitled "Initialize Program Variables". First of all, a set of instructions are executed to set up the screen width of the local user video display 24 which includes a color CRT, now shown. This is indicated as step 102. This set of instructions defines the screen to be of a width, for example, of 40 characters, that is, it will show a 40 character display extending from one side of the screen to the next. When desirable, the screen width can be set to 80 characters, depending upon the needs of the user.

Following this, the entire screen of the video display 24 is cleared as indicated by the "Clear Screen" step 104. Then parameters are set, as evidenced by reference numeral 106, designating the desired foreground, background, as well as the default colors for a color picture on the CRT. A parameter is next initialized which will set the maximum number of pictures, i.e. graphics, which can be saved in the form of an index file on the disks in the dual disk drive unit 26 (FIG. 2). This is shown by reference numeral 108 and for the basic embodiment of the program, the quantity is set to be 30 per "library" with a directory limit of 30 libraries. Next, a drive designation for graphic storage is set. This is shown by reference numeral 110, and for the embodiment of the invention shown in FIGS. 1 and 2, it comprises the dual disk drive 26. A flag is then set, as indicated by step 112, which indicates within the code whether the program executing is the internal program of the computer 16 or the Companion Graphics package which can be accessed through the local user keyboard 21. The next two instructions (steps 114 and 116) set up the area that will be used for saving the part of any graphics which would be covered by a menu, used during program execution. The program menus are stored in the last four lines of a twenty-five line display of the video display 24. This area of the screen is initialized to the selected background color and then copied into a local array (modem input buffer) which will be used for storing the section of the screen when a graphic is received. Along with this a flag is set which indicates whether or not the Main Menu is correctly being displayed and accordingly is initially set to be "true".

The final set of statements 118 and 120 executed in the program variable utilization section of the code defines the addresses in the video display buffer section 38 of the computer memory 30 which will be used when the entire contents of the buffer previously loaded from the disk drive unit 26 are transmitted to a remote user over the telephone line 12.

In the basic embodiment of the program, the CRT display has a minimum resolution of 200 horizontal lines. These graphic image lines are stored or defined by a section of the computer's Main Memory section 36. During the transmission of an entire picture, defining a particular graphic over the phone line 12 this set of lines is divided up into 100 segments, each of which will contain the information for two or more complete lines across the screen of a remote user's video display 24. The initialization process consists of computing and storing in local arrays the addresses in the video display buffer of each of the 100 valid segments for use during transmission or receipt of an entire picture. Invalid segments are rejected and replaced with the default background color. This process is indicated by reference numeral 118 of FIG. 5. Finally, a program pointer is set as evidenced by reference numeral 120, which sets the pointer to the first graphic (picture No. 1) in the graphic storage index. As referred to earlier, and following the initialization steps 58 and 60 (FIG. 3), the next procedure executed calls a routine 62 to display the Main Menu (Table I) with a flag being set indicating that this menu is being displayed. The local user may manually turn on his speakerphone 20 at anytime.

Again recapitulating, the first choice available by this Main Menu (Table I) is to connect the local user modem 18, i.e. bring the modem on line, in the case where a phone connection has already been established with one or more remote users. The second choice is to employ the local user modem 18 itself to dial the phone number of a remote user or in the case where a conference bridge 14 as shown in FIG. 1 is being used, the number of the bridge. These generate Connect (C) and Dial (D) commands, respectively. The third choice is to switch to a Companion Graphics program such as a separately provided Army Graphics program while the fourth and fifth choice involves transmitting and receiving graphic libraries. The local user is then asked to make a choice between the five. If the first option is chosen, the program will immediately put the local user modem 18 on line using a command which causes it to use the same frequency when transmitting and receiving hereinafter called the "answer mode". After putting the modem 18 on line, the program branches to a display routine (step 72) of the Standard Menu (Table II) which is displayed in the lower portion of the video display provided by the CRT of the display apparatus 24.

If instead of the "C" command of option No. 1 of the Main Menu the local user has chosen the second option, a "D" command is initiated and the program goes into a dial routine which executes that command. The dial routine is contained within a loop which is executed until either a successful connection is made to a remote user, for example, via the bridge 14 (FIG. 1) or the local user aborts the attempt. The first statements within the loop cause the local user modem 18 to hang up in case it should be on line at this point, i.e., when the local user begins the dialing sequence. Also text is printed on the CRT screen of the LU video display 24 requesting the local user to supply a phone number which is to be dialed. The local user, moreover, has the option of specifying pulse dialing instead of the default which is tone dialing. The local user is also offered the option of introducing one second delays at arbitrary points in the phone number. These are used when dialing through a PBX system in which a digit must first be entered to get an outside line and the remainder of the phone number is then entered. After printing this information on the CRT screen, the program waits for the local user input via the keyboard 21. If that input should happen to be actuation of the "Escape" key on the keyboard 21, the program aborts the attempt to dial a remote user and returns to the Main Menu (step 62) via the ESCAPE #1 route 79 shown in FIG. 3 which again provides the five options indicated by Table I.

If a phone number is now entered by the local user, a command string is set up to cause the modem 18 to dial the phone number and then return to the command state rather than going on line. Also in this string is a command to the local user's modem which will force it to be in the answer mode when connection is made. The reason for this is the same as described above with respect to the "C" command. After the modem 18 has been commanded to dial the telephone number, the program enters a brief delay loop and then clears the lower section of the local user's CRT and prints the question "Should the number be dialed again? Yes or No". If the local user hits the "Escape" key on the keyboard 21, then the modem 18 is commanded to hang up and a return is made to the initial Menu options (step 62). If the user, however, replies to the question entering "Yes", then the loop inside of the dial procedure is repeated. That will bring it down through the logic that has just been described, the first step of which is to hang up. Alternatively, if the local user doesn't press the "Escape" key and doesn't say "Yes", but enters "No" on the keyboard 21 indicating that he does not want to dial the phone number again, the modem 18 is put on line and its speaker is turned off. A flag which indicates whether or not the Main Menu is to be displayed is set to "False" and a return from the dial procedure is executed. Finally, if the local user selects the option requesting option No. 3 of the Main Menu which requests External Graphics, then all local files of the computer 16 are closed, the external Companion Graphics program is run and the internal program of the computer 16 exits (step 70).

Once a successful connection is made to a remote user, however, the computer program of the local user computer 16 enters its main loop (step 74) which is executed from now until the "Escape" key on the keyboard 21 is hit and consists in first looking for a local input from the keyboard 21 which would designate one of the commands available on the Standard Menu (Table II) at this point. The commands available are: "Use", "Save", "Transmit", "View", "Next Picture", "Previous Picture", "Index", "Graphics", "Tab" and "Escape". The functions associated with these commands are set forth in the flow charts shown in FIGS. 8 through 17.

Assuming for the moment, however, that no local user keyboard input has been received, the main program loop (step 74) then checks to see whether any incoming characters have been received from a remote user computer 16 via the modem 18, for example, either a "V" code or a "T" code. The local user program calls a routine which checks the input buffer of the local user modem 18 to see if any characters are present. Since the receiver section for the modem 18 is always active, i.e. "on" following initialization, it is likely that characters have been received; however, such characters are most likely erroneous ones constructed from the sound of user's voices, for example. Accordingly, the first thing the routine does is to see if there are at least five characters in the modem's input buffer. If not, it returns immediately to the main program loop of step 74 (FIG. 3).

If, on the other hand, there are at least five characters in the input buffer of the modem 18, the routine goes into a loop which retrieves characters from the input buffer in groups of five. Each group of five characters is then checked to see if it, for example, consists of five repetitions of the letter "V" or five repetitions of the letter "T". If either of these two patterns is detected, then execution continues as shown by the flow diagrams in FIGS. 6 or 7; otherwise, control returns to the main program loop (step 74) checking for keyboard entries.

Considering now first that a five character pattern consisting of the letter "V" has been detected, reference is now made to FIG. 6 wherein step 122 indicates that a routine is called which handles an incoming "View" command for local user viewing of a specific graphic already stored in his dual disk drive unit 26. The local user speakerphone 20 is turned off as indicated by reference numeral 124 followed by an initialization of a local storage array in Main Memory 36 (FIG. 2) having the ability to contain twelve data set names followed by a clearing of the CRT display 24 and an internal flag is set to "true" which indicates that a new data set name is required. This routine is comprised of a loop consisting of two portions depending upon the answer to a query 126 made regarding the presence of the specific graphic in the local user index. Thus in the loop, incoming graphic names are installed in the empty array and the loop proceeds from the first entry to the twelfth entry and compares each new name to all previous names in turn. If the current name is not the same as any previous entry, then the loop continues looking for subsequent entries. If a single match is discovered, then it is assumed that this is the true graphic name that is required and at that point power to the local user speakerphone 20 is turned back on as indicated by reference numeral 128 and the data set name is placed in a procedure 130 that loads the video display buffer section 38 of the memory 30 from the disk drive 26 and the graphic is generated (step 132) on the CRT of the local user's video display 24. The lower portion of the display is stored in an internal array so that the Standard Menu (Table II) may be displayed without losing any data. The modem's input buffer is then cleared and the Standard Menu (Table II) is redisplayed if the flag to display the menu says that it should be done and the procedure returns to the main program loop via ② providing an escape, i.e. ESCAPE #2, back to steps 72 and 74 as shown in FIG. 3. If it is found that the graphic that is commanded by the remote user to be viewed is not present in the index, the speakerphone is turned on in step 134 and a message is displayed to the local user, per step 136, advising him that the graphic is not on hand, and the procedure returns back to the Standard Menu via ② at which time the remote user can, if desired, transmit a "T" code which now leads to a consideration of FIG. 7.

The "T" code is used by the remote user to transmit the contents of his screen buffer to the local user. If five repetitions of the letter "T" are detected by the local user, then another routine is called to handle the incoming "T" code as indicated, in FIG. 7, by reference numeral 138, which is a command to handle the contents of a graphic which is transmitted from a remote user. Power to the speakerphone 20 is turned off, per step 140, and a routine 142 clears the local user's display screen or CRT and sets an internal flag indicating that graphic data is being received in segments preceded by header data consisting of five consecutive zeros. If a zero is found, the next byte is checked to see whether it also contains a zero. If it does, then subsequent bytes are examined until a non-zero value is found. This value is taken to be a segment number and a flag indicating that a segment header is needed is then set to "false". The program logic will then remain in a loop looking for zeros until two successive zeros are found or until 1600 attempts have been made to retrieve the character from the input buffer of the local user modem 18. If there is none available, the entire routine will terminate its execution and control is returned to the main program loop via ② after the local user's speakerphone 20 has been turned on by step 144.

Assuming that the appropriate header data is detected, the number of the segment is used to obtain the address of the particular segment in the local user modem buffer memory. In the preferred embodiment, all data are encoded or compressed before transmission. In one case the data are interpreted as byte pairs, the first byte containing a count and the second one a bit pattern consisting of the color of four pixels. Each byte pair is expanded by copying the pattern byte the indicated number of times into the video display buffer memory section 38 (FIG. 2) up to the limit of the amount of memory required to display a particular segment. After all the bytes of the segment have been written into the display memory 38, a flag indicating that the signal header is required is set to "True" and processing continues as in the first half of this routine. The use of segmented transition in this way has the effect of restricting any data error in the transmission to a single pair of lines on the screen. Segments with out of sequence segment numbers are rejected entirely. When the main loop in this procedure times out, which is about one second of silence on the part of the modem, then the lower portion of the CRT screen of the video display 24, which will be covered up by the menu that is displayed, is stored in the local array and control returns to a routine which turns the speakerphone 20 back on as indicated by reference numeral 144 and then returns to the main program loop via ②.

Consider now the condition where a local user keyboard entry is made on keyboard 21 as indicated by step 80 (FIG. 3) where one of the ten Standard Menu options as set forth in Table II has been selected prior to a reception of any "V" or "T" code from a remote user. Selection of any one of these options generates a command for execution of the specific functions now to be described.

The "Use" and "Save" commands are designed to locally retrieve from and store graphic images in the local user's disk drive unit 26. The "Transmit" command takes whatever is currently on the CRT of the video display 24, i.e. the contents of the video display buffer section 38 in the main memory 30, and transmits it preceded by a "T" code over the telephone line 12 to remote user(s) connected via the telephone system and constitutes the complement of the receive "T" code step 78 shown in FIG. 3. The "View" command takes an argument from the local user either as a number or the name of a graphic in his disk storage unit 26 and sends it as a "V" code to designated remote users for them to retrieve that same graphic from their own RU disk storage means 26 and display it on their respective remote user video display units 24 and comprises the complement of the receive "V" code step 76 of FIG. 3. The "Next" and "Previous" commands coordinate with an index file that refers to the following or previous graphic displayed by the local user which is then coupled with a "View" command for the appropriate graphic to be displayed by the remote user(s). The "Index" command displays a list of all the locally stored graphics on the local user video display 24 and allows the local user to either delete pictures from the index file or to renumber the pictures as desired. The "Graphics" command allows the local user to switch to the aforementioned Companion Graphics program. The "Tab" is the command used to reveal or suppress the display of the Standard Menu, while the "Escape" command is used to abort the main program loop and return the user to the Main Menu (Table I) via ESCAPE #1, i.e. route 79, shown in FIG. 3 or to the Standard Menu (Table II) via ESCAPE #2, i.e. route 81.

The "Use" and "View" commands require that the local user indicate which graphic is to be displayed on his video display 24. The "View" command also requires the local user to indicate which picture or graphic is to be shown simultaneously on all of the remote user CRTs. These two commands have a short code form in which the number of the desired graphic can be entered immediately following the selection of the "U" or the "V" key on the keyboard 21 and the appropriate logic to handle such a command is included in the main program loop. Essentially what is done is that the incoming characters from the local user are collected in a local string until a "carriage return" is observed. At that point the collected string is analyzed to see if its last few characters were in a picture number or not. If they were a picture number, that number is placed in another local variable which is checked by "Use" and "View" routines when they are called. The main program also contains logic to change any incoming characters to upper case.

Since the "Index" file is used with many different commands, a word about this file is in order. It basically consists of a text file which has as entries the data set name for each graphic or picture, a user designated descriptive title which is optional, and a predetermined number of parameters indicating the foreground and background colors for a particular graphic. Routines are included in the control program to read this index file from the disk included in the disk drive unit 26, to write it to the disk drive unit, and to scan it looking for a particular data set name. There are also routines to renumber and delete graphics which will be described subsequently.

Figure 8:
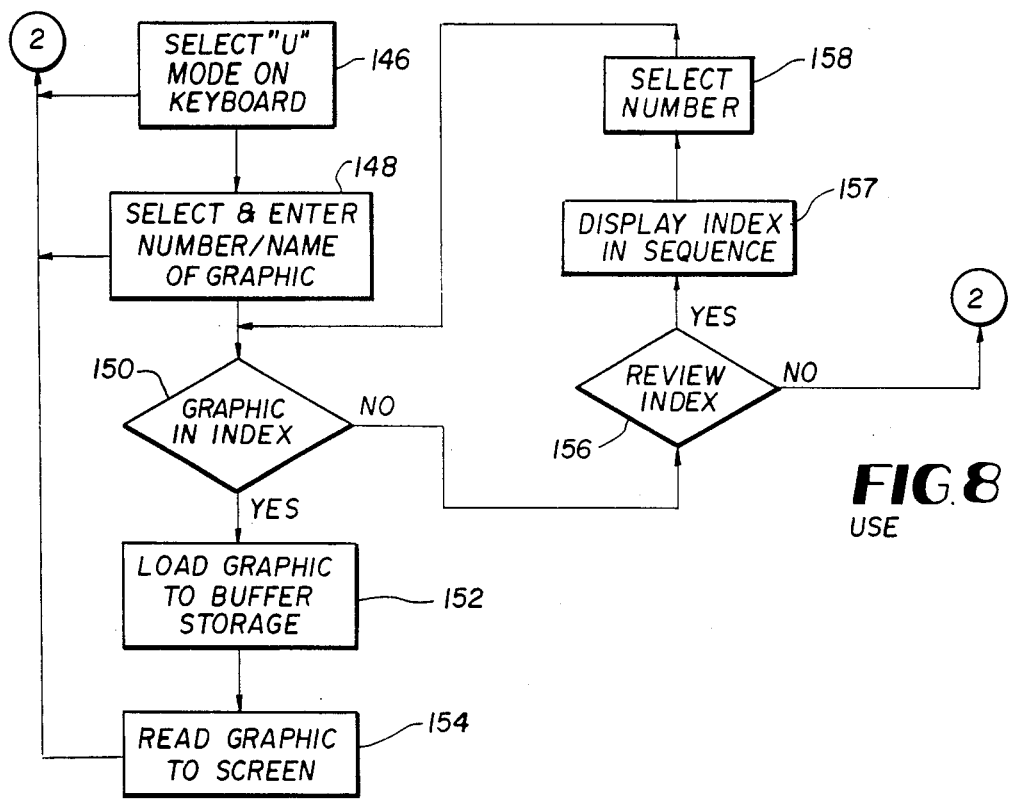

Considering now in greater detail the Standard Menu options of Table II, reference will now be made first to FIG. 8 which discloses the "Use" routine. Accordingly, when the local user selects the "U" mode on his keyboard 21 by typing in the letter "U", which is indicated by step 146, the main program checks to see whether or not a number of a graphic was included in the command. If it was, the index is retrieved and the data set name of the graphic at that number is placed into a variable. If the user did not include a number, the picture name variable is set to be empty. If the picture name variable is empty, the message is printed in the menu area asking the local user to enter the name or the number of the picture desired 148. After the required information is obtained, it is checked to see whether it is an "escape" character. If it is, the procedure is exited back to the Standard Menu step 72 (FIG. 2) via ②.

If the input data from the user is a number, then the entry in the index is used to obtain the data set name stored there. If the input data is a name, then the name is used in a scanning routine. It is to see whether or not the name occurs in the index. Next a query is made as indicated by step 150 to determine whether or not the required graphic or picture is in the index. If the graphic is in the index, it is loaded to the local user's video display buffer 38 from the disk drive 26 and read to the CRT of the video display unit 24 as indicated by steps 152 and 154. If the graphic is not in the index, then a scanning routine is called to see whether or not that name or number occurs in the index. If there is no picture by the name entered, a message to that effect is displayed and the local user is asked whether or not he wishes to review the index of the graphics that are saved on the index file immediately as indicated by step 156. If the user hits the "Escape" key or indicates "No", the routine is exited back to the Standard Menu display via ②. If the user indicates affirmatively that he wishes to review the index, then the entries from the index file are displayed in the menu area in sequence as indicated by step 157 and can at any point choose an entry typing in a number (step 158) and which will be used for further processing. This search is circular so that when the end of the list of graphics is reached on the next file the first entry is again shown on the screen. Finally when it has been determined which graphic the local user desires, a binary loaded instruction which is included in step 152 is included in the programming language and is invoked to load the data from the disk file into the video display buffer 38. This has the effect of displaying the graphic on the local user's screen. It should be noted that with the "use" command, no data is transmitted using the modem and all of the remote users will be unaware that the local user is bringing a different picture up on his display.

Figure 9:
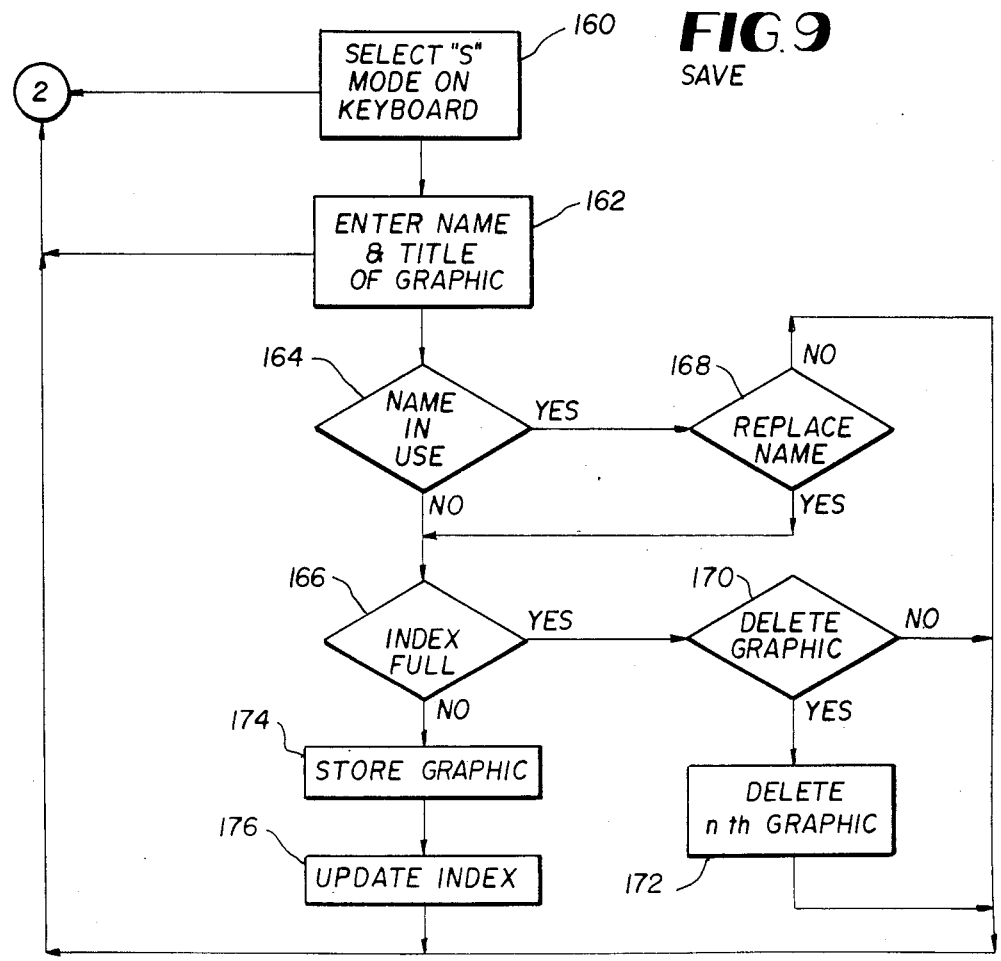

Considering now FIG. 9, when the local user initiates a "Save" command by typing "S", for example, on his keyboard 21 as evidenced by step 160, the graphic name variable is set to "empty", indicating that the identity of the graphic that is to be saved in the index file is unknown and the procedure that is used to save the video display buffer is called which asks the local user to enter a name and descriptive title of the graphic. This is indicated by step number 162. During either step 160 or 162, the local user can hit the "Escape" key which would abort the procedure and return to the main program loop (step 74) via ②. Once the name and title are known, the index is retrieved from the local user's dual disk unit 26 and is scanned in order to determine two things as indicated by the queries 164 and 166. The first query 164 is whether the picture name already exists, meaning that it is in use, and secondly 166, if it doesn't, whether there is an empty slot in the index which can be used to store the particular graphic information. If the graphic name exists, the user is informed that this is the case and is asked whether he wishes to replace the current graphic name with a new one. This is shown by reference numeral 168. If the reply is in the negative or the user hits "Escape", the character of the routine is aborted and the program exits back to the Standard Menu (step 72) via ②. If, however, the reply is affirmative, then the slot in the index is the one that will be used when the particular graphic is stored. If the graphic did not already exist in the index and there is no room in the index for a new entry, the user is advised of this fact and is asked whether he wishes to delete any of the graphics that are currently stored in the index. This is shown by reference numeral 170. If the local user replies in the negative or enters "Escape", the routine is aborted and exits via ESCAPE #2 back to the Standard Menu. Otherwise, another routine is entered as shown by reference numeral 172 which allows the user to delete pictures after which the routine exits back to the Standard Menu display via ②. In the "delete" routine 172, each entry from the index is shown in succession on the user screen and if the user hits the "D" character, then the graphic will be deleted. If, however, the user hits "carriage return", the next entry from the index is shown on the screen. The display is circular in that after the last entry in the index is displayed, the first one will again be displayed. At any time during the procedure, the user can hit "Escape: in which case control is returned to the main program loop via ②.

In any event due to the fact that this subroutine was invoked, the local user must select the "Save" routine again in order to store the graphic and thus if the index is not full, and if the name was not found in the index or given that the name was found and the user indicated that he wishes to replace the picture with a new version, then the first portion of the picture which was previously saved that would have been displayed in the menu area is retrieved on the screen and then a binary "Save" routine that is included in the language being used is invoked to copy the contents of the video display buffer to the disk file named by the user. This is indicated by step 174. After this has been completed, the index is updated as indicated by step 176 and the revised index is written back to the storage of the dual disk drive unit 26, and control returns to the main loop via ESCAPE #2, i.e. ②.

Referring now to FIG. 10, when the local user wishes to transmit an on-screen graphic to a remote user during a teleconference, for example, he selects the "T" mode on his keyboard 21 by pressing the key labeled "T". This is shown by the block 178. A flag is immediately checked to determine whether or not the Standard Menu (Table II) is currently being displayed on the user screen. If it is, it is replaced with a portion of the picture that was saved at the time it was previously displayed on the video display 24. Then control passes to a routine which accomplishes the actual transmission of the required graphic to the remote user(s). The first statement in this routine calls for a procedure 180 which turns off power to the local user's speakerphone 20 by way of the multiposition power relay 48 (FIG. 2) and the parallel I/O port 34. When the speakerphone 20 has been turned off, the transmitter section of the local user's modem 18 is turned back on by sending a command to that effect to the modem. This is indicated by step 182. After this a signature or "ID" signal is sent out (step 184) which consists of a character "T" which is repeated 12 times and serves as a signal to the remote user computers 16 in the network that a picture is about to be transmitted. It might be recalled that this is the complement of the reception of the "T" code referred to above (step 78).

Next a routine is called to construct and transmit the graphic code to the remote users. This is shown by reference numerals 186 and 188 and comprises the transmission of 100 individual data segments, each of which consists of two or more alternating lines across the screen, with each segment being, as noted earlier, proceeded by a segment header consisting of five repetitions of a byte containing the number 0 and then a byte which contains the segment number ranging from 1 to 100. Following this the data in the segment is compressed, e.g. using byte pairs, each byte pair indicating (a) one of the four colors and (b) the number of continuous pixels of that color. A new byte pair is created at each color change until all pixels in the segment have been described and transmitted. After all the byte pairs for the segment have been sent out, the loop over the segments is incremented and the logic is repeated for the next segment. Once all the segments have been scanned, compressed and transmitted, the modem's transmitter is turned off while keeping the receiver on as indicated by step 190, following which the local user's speakerphone 20 is turned back on as evidenced by step 192 and control returns to the main program loop (step 74) where the Standard Menu is displayed (step 72). The control return path is via ②.

Referring now to FIG. 11, when a "View" command is generated by the local user by his entering "V" on the keyboard 21 per step 194 of FIG. 11, control transfers to a routine which asks the remote user(s) to display a particular graphic which is supposedly on hand in his respective dual disk drive unit 26. This procedure first checks to see whether the local user has supplied a number for the graphic with the view command. If this is not the case, the user is asked by step 196 to enter the name or number of the graphic that is desired. In both instances the user can press the "Escape" key and return to the main control loop via ②. When the name or number has been entered, the index is scanned to see whether or not the graphic required exists. This is shown by the query 198. If it does not, the user is asked whether he wants to review the index list as shown by the query 200. If the answer is in the negative or the "Escape" key has been hit, the routine aborts and control returns back to the Standard Menu display (step 72) and the main program loop 74 via ②. A "YES" response initiates a picture by picture listing (step 201) which permits the user to select the number of the desired graphic as shown by the block 202, whereupon the local user's speakerphone is turned off by power relay 48 as shown by step 206. Next a "V" code is transmitted by the local user (step 208) to the remote user(s) and which consists of an ID signal comprised of a group of characters beginning with 10 "V"s followed by three bytes containing the number of the graphic and the data set name for the graphic. This group of characters is transmitted twelve times to the input buffer of remote user modems 18 with brief pauses in between and comprises the opposite sequence to receive the "V" code described with reference to step 76 of FIG. 3. The graphic to be viewed on remote user video display unit 24 is simultaneously read to the local user video display unit 24 per step 210, whereupon the local user's modem transmitter is turned off, the speakerphone is turned back on as evidenced by the blocks 212 and 214 and control returns to the main program loop (step 74) via ②.

With reference to FIG. 12, if the "Next" picture in the index of stored graphics is desired, the local user enters "N" on the keyboard 21 as indicated by step 216 which is followed by an increment of the index pointer (step 218) whereupon the "View" routine is again executed per step 220 with a return to the main program loop by means of an escape via ②. This escape is also initially available upon selection of the "Next" mode as indicated at step 216.

In the event that the "Previous" picture or graphic is desired, it is handled substantially in the same manner in which the previously described "Next" routine is accomplished and, as shown in FIG. 13, requires selection of the "P" mode on the local user keyboard by pressing the "P" key. This is shown by block 222 which is followed by a decrement of the index pointer to the previous graphic as shown by step 224, whereupon the "View" routine is again called as shown by step 226, with a return to the main program loop via ESCAPE #2. It should be noted that the "View" command as well as the "Next" picture and "Previous" picture depends for their success upon the fact that all of the remote users in the network of the system shown in FIG. 1 already have the required graphics stored in their respective dual disk drive units 26.

The local user can initiate an "Index" command as one of the Standard Menu options and as FIG. 14 indicates by entering an "I" on the local user keyboard 21. This is shown as step 228 which also includes an escape via ②. Thereafter the CRT of the local user's video display unit 24 is cleared (step 229) followed by a retrieval and display of the index stored in the disk drive unit 26 as evidenced by step 230. With a display of the index, the local user is given the option of now renumbering or deleting graphics. If renumbering is desired, the local user next presses the "R" key on the keyboard (step 231). The local user then enters the number of the "old" picture currently being displayed (step 232) followed by an entry of the "new" number which is desired (step 233). A change entry subroutine is now run wherein the index is checked to see whether the entry the user has made is valid and if the number for the old graphic does not correspond to a line which stores the picture data, then the user input is ignored and the subroutine is repeated for pairs of old and new numbers. Similarly, if the entry obtained for the line which is to contain the picture now already contains a graphic, then the input is ignored and the local user is asked again to enter that number. Once valid values have been obtained for the old number and the new number, the order of the index is changed (step 234) simply by moving the line from its current position to a new one, and the index is thereafter redisplayed. At that point, the subroutine starts over again, requesting the user to enter another "old" number; however, when desirable, the local user can hit the "Escape" key on the keyboard 21.

If, on the other hand, the local user wishes to delete a graphic, he first enters "D" on the keyboard as indicated by step 235 and then enters the number of the picture that he wishes to delete (step 236). The number is checked to see if it appears in the index by the query 237. If the answer is negative, the subroutine loops back to step 236. An affirmative answer results in the user being asked whether or not he wishes to delete that particular picture (step 238). If the user replies in the negative, there is a return to step 236. If the user answers in the affirmative, however, the picture is then deleted as from the disk in the disk drive 26 as indicated by step 239 and that line of the index is replaced with blanks. When the picture has been deleted, the subroutine reverts back to the selection steps 231 and 235. Also an escape back to step 235 can be made at the entry (step 236) of the picture number to be deleted. Each time the local user successfully deletes a graphic, the index file is rewritten to the disk drive unit 26 so that it will always contain accurate information.

Option No. 8 of the Standard Menu as shown in Table II comprises a local user's selection of a Companion Graphics program e.g. "Army Graphics" and furthermore is identical to option No. 3 of the Main Menu. This dual option is shown in FIG. 15 and involves first activating the "A" key on the keyboard 21 as evidenced by step 240, whereupon an internal flag is checked to see whether or not the Main Menu or the Standard Menu is being displayed. If the initial five Main Menu choice of Table I is being displayed, as indicated by reference numeral 241, then all files are closed (step 242) and the graphics program is run per step 243. If on the other hand the Standard Menu is displayed as indicated at 244, a warning (step 245) is displayed to the local user indicating that his speakerphone 20 must be left off the hook in order to maintain a conference connection. Then the local user is asked (query 246) if, in light of the fact, he still wishes to proceed to the Companion Graphics program. If the local user enters "No", the command is aborted and return or escape to the main control loop (step 74) is effected via ②. If the reply is in the affirmative, the phone line is dropped per step 247, all files are kept open per step 248 but control is transferred to the Companion Graphics program as indicated by step 250.

Next if the local user presses the "Tab" key on the keyboard 21, as indicated by reference numeral 252 of FIG. 16, an internal flag, indicating whether or not a menu is being displayed, is switched, i.e., if the flag was set to be "true", it would be set to "false" and vice versa. If a menu was being displayed in addition to setting the flag to "false", a routine is called which retrieves the stored portion of the picture in the main area and places it on the CRT of the local user's video display unit 24. If a menu is not being displayed, then after the flag is switched, the menu is printed on the CRT. This is indicated by step 254.

Finally, the "Escape" option as shown by FIG. 17 involves hitting the "Escape" key on the keyboard 21 within any one of the Index (FIG. 14), Previous (FIG. 13), Next (FIG. 12), View (FIG. 11), Transmit (FIG. 10), Save (FIG. 9), or Use (FIG. 8) operational modes of the Standard Menu options as indicated by step 256. This causes the Standard Menu (FIG. 2) to be again displayed (step 258). Now if the "Escape" key is again pressed or hit at any time when the Standard Menu is being displayed, the program will revert back to a display of the Main Menu as shown by step 260.

As indicated earlier, the main program loop comprises a sequence of instructions which continually check to see if the local user has pressed any keys on the keyboard 21 or checks the input buffer of the local user's modem 18 to see if any characters have been received from a remote user, indicating that the local user is in receipt of either a "V" code or a "T" code and executes which routine is called for and once the routine has been completed, resumes its checking of both the keyboard and the modem.

Thus dial-up audiographic communication is provided between a plurality of participants in a conference call connection while using a single existing voice grade telephone line. The apparatus of the subject invention is designed to be unobtrusively "on" during a conference call between the parties and is silent unless ordered to transmit, in which case, for example, graphics are retrieved from computer storage and sent simultaneously to all participants at the appropriate moment in a conversation while requiring approximately 40 seconds per graphic, during which conversation is not possible. When desirable, however, graphics may be transmitted prior to the actual telephone conversation and retrieved from each local storage on demand at a rate of approximately 7 seconds per graphic.

While there has been shown and described what is at present considered to be the preferred method and apparatus for practicing the invention, it should be noted that other modifications will readily occur to those skilled in the art. Accordingly, it is not desired that the invention be limited to the specific arrangements shown and described, but it is intended to cover all such modifications as fall within the spirit and scope of the invention as defined in the appended claims.

I claim:

1. A method of integrating graphics into a teleconference between at least two participants, a local user and a remote user, each provided with a computer programmed to control a programmable modem including a receiver and a transmitter, and a respective telephone apparatus including a speakerphone connectable to a telephone line for voice conferencing, comprising the steps of:

initializing said modem so that said receiver continuously silently monitors telephone communications between users without interference with voice conferencing except when transmitting;

initializing predetermined program variables in the computer program of said computer including enabling said modem transmitter to transmit graphic images;

displaying a first menu of a plurality of local user options, said first menu including the selective steps of: connecting to an incoming phone call, dialing a remote user telephone, interrupting the modem receiver to transmit a graphic image during the interruption, transmitting a full library and respective index of graphics to at least one said remote user, receiving a full library and respective index of graphics from at least one said remote user, and storing at least one of said libraries and its respective index in local user storage;

selecting a first menu option and depending on the selection displaying a second menu of a plurality of local user options;

checking the selection of any second menu options and executing a selected option and, if none is selected, checking for the reception of a graphic code from a remote user to display either a specified graphic image received from said remote user and stored in local user storage or to display a graphic image contemporaneously generated and transmitted from the remote user.

2. The method as defined by claim 1 wherein one of said plurality of second menu options comprises the step of signaling a remote user apparatus to retrieve a specific graphic image from the remote user's image storage and displaying said graphic image on the remote user's display unit, which step is defined as the "view" option.

3. The method as defined by claim 1 wherein said plurality of second menu options includes the steps of selectively displaying the next and previous graphics, respectively, as ordered in said index in the local user storage, which steps are defined as the "Next" and "Previous" options.

4. The method of claim 1 wherein one of said plurality of second menu options comprises the step of displaying said index of graphic images contained in the local user storage which step is defined as the "Index" option.

5. The method as defined by claim 1 wherein said step of initializing said modem includes the step of restricting operation of the telephone line to one half of the available modem bandwidth.

6. The method as defined by claim 1 wherein said step of initializing the modem includes the step of commanding the modem to ignore all signals on the phone line except when preceded by an authorized identification code indicative of a graphics image related signal being transmitted thereto from a remote user.

7. The method as defined by claim 1 wherein said step of initializing program variables includes the steps of setting the parameters for graphic images to be stored and displayed, designating storage areas therefor in a memory, and establishing storage areas of the first and second menu options in said memory followed by setting a program counter or pointer to a reference number position.

* * * * *